(No Model.)
J. STEPHANI.
MOWER.
No. 475,823.  Patented May 31, 1892.
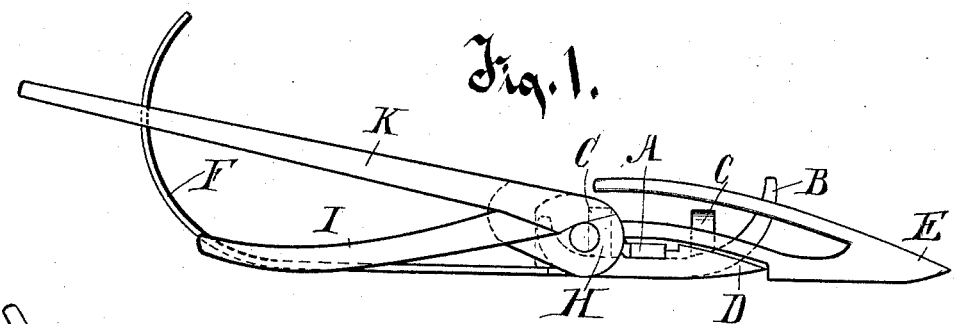
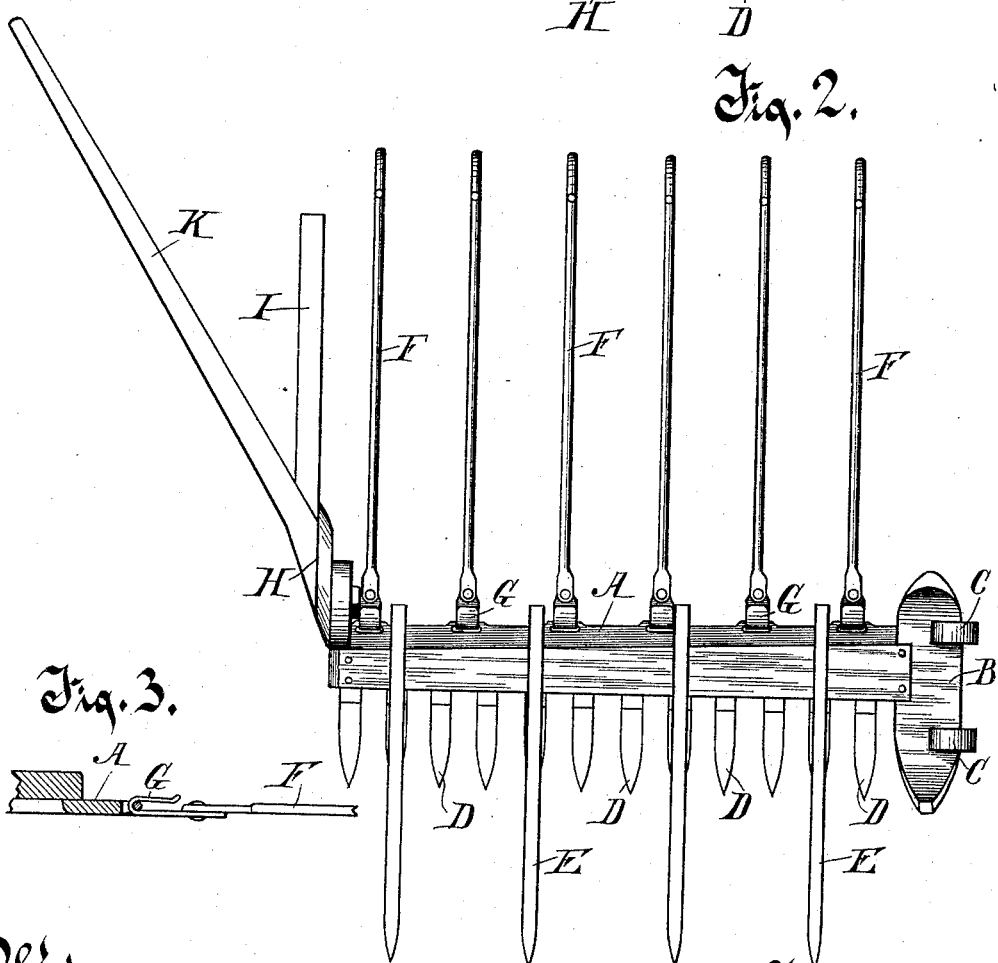
Witnesses.
H. Keeney
Anna V. Faust
Inventor.
John Stephani
By C. T. Benedict
Attorney.

UNITED STATES PATENT OFFICE.

JOHN STEPHANI, OF MANITOWOC, WISCONSIN.

MOWER.

SPECIFICATION forming part of Letters Patent No. 475,823, dated May 31, 1892.

Application filed December 10, 1891. Serial No. 414,558. (No model.)

*To all whom it may concern:*

Be it known that I, JOHN STEPHANI, of Manitowoc, in the county of Manitowoc and State of Wisconsin, have invented a new and useful Improvement in Mowers, of which the following is a description, reference being had to the accompanying drawings, which are a part of this specification.

The object of my invention is to provide means in connection with the finger-bar of a mower to adapt it for cutting and gathering pea-vines.

The invention consists in the devices attached to and combined with the finger-bar of a mower, by which the pea-vines when cut are caught and carried along with the machine until a considerable supply has accumulated, when the mass is removed by the operator, and in a device, also attached to and combined with the finger-bar of the mower, adapted to push away and ward off the uncut vines from the machine from the mass of cut vines being gathered on the machine.

In the drawings, Figure 1 is an end view of a mower finger-bar with my improved devices connected thereto. Fig. 2 is a top plan view of the mower finger-bar with my improved devices connected thereto. Fig. 3 is a detail of the construction.

The precise form of the finger-bar or the method in which it is attached to the frame of the mower is not important and forms no part of my invention. In the drawings a finger-bar is shown which is adapted for attaching my improved devices thereto, and when so combined the complete device is adapted for cutting pea-vines, which are well known to be sometimes very long and always to be in a tangled mass near the ground.

The finger-bar A, (shown in the drawings,) adapted, in combination with my improved devices, for cutting and gathering pea-vines, is provided with a shoe B at its inner end, having ears C C, by which it is hinged to the mower-frame, and also, besides the knife-guides D D, has preferably a few larger fingers or guards E E, adapted to separate, elevate, and straighten the pea-vines sufficiently to be cut by the knives.

For the purpose of catching the pea-vines after they have been cut by the machine I attach a catcher to the finger-bar, which catcher consists of a series of fingers F, turned upwardly and slightly recurved at their rear extremities. These fingers are constructed of large-sized steel wire, preferably elastic, severally hinged at their front ends to a link or hook G, which takes into a slot therefor in the finger-bar A. These hooks G are detachable from the finger-bar, so as to permit of the removal of the fingers F from the bar A when it is to be used for other purposes than for cutting pea-vines. Otherwise the fingers might be pivoted directly to the bar A. The fingers F are located at little distances apart and are so hinged to the hooks G as to trail therefrom directly behind the finger-bar and to be capable of swinging laterally each independently of the other. This capability of free lateral movement adapts the fingers for assuming oblique positions and for properly following the finger-bar A when the machine turns around or when it turns a corner, either when at work or otherwise. These fingers F rest and trail on the ground and catch and carry the pea-vines as they pass over the finger-bar until a considerable mass is accumulated, when they are removed by an attendant either with a fork or other suitable implement.

For the purpose of pushing the uncut pea-vines away from the machine and separating them from the vines that have been cut and have fallen onto the catcher a fender H is provided, which is pivoted to the outer end of the finger-bar A, so as to be free to swing vertically. This fender consists of the rearwardly-extending and downwardly-curved arm I, arranged to trail on the ground from the outer end of the finger-bar just at the edge of the uncut vines, and the upwardly and outwardly projecting arm or guard K. This upper arm K is located at such height above the ground as to bear against the uncut vines and force them away from the machine and away from the vines that have been cut and are falling on the catcher. The arm extends rearwardly beyond the rearward extension of the fingers F F and outwardly sufficiently far to crowd the uncut vines over on themselves as the machine is hauled along past them.

What I claim as my invention, and desire to secure by Letters Patent, is—

1. The combination, with the finger-bar of a mower, of a series of rearwardly-extending and upwardly-curved fingers attached to the finger-bar pivotally, so as to be capable of independent lateral movement, substantially as described.

2. The combination, with the finger-bar of a mower, of rearwardly-extending and upwardly-curved fingers and hooks to which the fingers are severally pivoted, so as to have lateral motion therein, the hooks being adapted to engage the finger-bar in suitable apertures therefor, substantially as described.

In testimony whereof I affix my signature in presence of two witnesses.

JOHN STEPHANI.

Witnesses:
FERDINAND STEPHANI,
JOHN BRACHMANN.